United States Patent
Watanabe et al.

(10) Patent No.: US 9,285,868 B2
(45) Date of Patent: Mar. 15, 2016

(54) CAMERA DEVICE, COMMUNICATION SYSTEM, AND CAMERA SYSTEM

(71) Applicants: Tomoki Watanabe, Kanagawa (JP); Ryuzo Okada, Kanagawa (JP)

(72) Inventors: Tomoki Watanabe, Kanagawa (JP); Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/728,592

(22) Filed: Dec. 27, 2012

(65) Prior Publication Data

US 2013/0182126 A1    Jul. 18, 2013

(30) Foreign Application Priority Data

Jan. 16, 2012    (JP) .................................. 2012-005828

(51) Int. Cl.
*H04N 5/225*    (2006.01)
*H04N 5/228*    (2006.01)
*G06K 9/54*    (2006.01)
(Continued)

(52) U.S. Cl.
CPC .......... *G06F 3/005* (2013.01); *G06F 17/30247* (2013.01); *G06F 21/00* (2013.01); *G06F 21/36* (2013.01); *H04W 12/06* (2013.01); *H04L 63/0861* (2013.01)

(58) Field of Classification Search
CPC ....... G01S 19/13; G01S 19/14; H04L 9/3247; H04N 1/32128; H04N 2101/00; H04N 2201/0084; H04N 2201/3214; H04N 2201/3253; H04N 2201/3274; H04N 2201/3281; H04N 5/2252
USPC ................. 348/207.1, 207.11, 208.14, 211.2; 382/118, 305
See application file for complete search history.

(56) References Cited

U.S. PATENT DOCUMENTS

| | | | | |
|---|---|---|---|---|
| 7,440,594 B2 * | 10/2008 | Takenaka | ........... | G08B 13/1961 382/118 |
| 2005/0110634 A1 * | 5/2005 | Salcedo | ........... | G08B 13/19673 340/539.1 |
| 2007/0201767 A1 * | 8/2007 | Fujita | ................ | G06F 17/30265 382/305 |
| 2009/0115852 A1 * | 5/2009 | Jung | .................. | H04N 1/00137 348/207.1 |
| 2009/0316005 A1 * | 12/2009 | Ito | ..................... | G06F 17/30247 348/207.1 |

FOREIGN PATENT DOCUMENTS

| | | |
|---|---|---|
| CN | 101025764 | 7/2007 |
| JP | 2010-004106 | 1/2010 |
| JP | 2010-086403 | 4/2010 |

OTHER PUBLICATIONS

Office Action mailed Sep. Oct. 14, 2014 in counterpart Japanese Patent Application No. 2012-005828 and English-language translation thereof.
Office Action mailed Mar. 10, 2015 in counterpart Japanese Patent Application No. 2012-005828 and English-language translation thereof.

(Continued)

*Primary Examiner* — Trung Diep
(74) *Attorney, Agent, or Firm* — Nixon & Vanderhye, P.C.

(57) ABSTRACT

An example camera device includes an image capturing unit configured to capture an image, and a storage unit configured to store first attribute information of a target object used for identifying the target object from the image. The camera device also includes an identification unit, a requesting unit, and a storage control unit. The identification unit is configured to identify the target object in the image captured by the image capturing unit based on the first attribute information. The requesting unit is configured to request an external device to identify the target object when the identification unit is not able to identify the target object. The storage control unit is configured to receive second attribute information of the target object from the external device that is requested to identify the target object, and control the storage unit to store the second received attribute information.

10 Claims, 9 Drawing Sheets

(51) Int. Cl.
*G06F 3/00* (2006.01)
*G06F 17/30* (2006.01)
*G06F 21/00* (2013.01)
*G06F 21/36* (2013.01)
*H04W 12/06* (2009.01)
*H04L 29/06* (2006.01)

(56) References Cited

OTHER PUBLICATIONS

Office Action mailed Jun. 10, 2015 in counterpart Chinese Patent Application No. 201310013525.4 and English-language translation thereof.

* cited by examiner

CAMERA DEVICE, COMMUNICATION SYSTEM, AND CAMERA SYSTEM

CROSS-REFERENCE TO RELATED APPLICATION

This application is based upon and claims the benefit of priority from Japanese Patent Application No. 2012-005828, filed on Jan. 16, 2012; the entire contents of which are incorporated herein by reference.

FIELD

Embodiments described herein relate generally to a camera device, a communication system, and a camera system.

BACKGROUND

In the related art, a technique of performing authentication in a server using an image captured by a camera and cancelling protection of secrecy when the authentication succeeds has been known.

However, in a system of transmitting an image to a server to process the image, as the number of cameras is increased, the number of images transmitted to the server is increased in proportion to the number of cameras, so that the speed of the process of the server is decreased.

DETAILED DESCRIPTION

According to an embodiment, a camera device includes an image capturing unit configured to capture an image, and a storage unit configured to store first attribute information of a target object used for identifying the target object from the image. The camera device also includes an identification unit, a requesting unit, and a storage control unit. The identification unit is configured to identify the target object in the image captured by the image capturing unit based on the first attribute information. The requesting unit is configured to request an external device to identify the target object in the image when the identification unit is not able to identify the target object in the image. The storage control unit is configured to receive second attribute information of the target object from the external device that is requested to identify the target object, and control the storage unit to store the second received attribute information.

First Embodiment

Hereinafter, a communication system 1 according to a first embodiment will be described in detailed with reference to the attached drawings.

Figure 1:
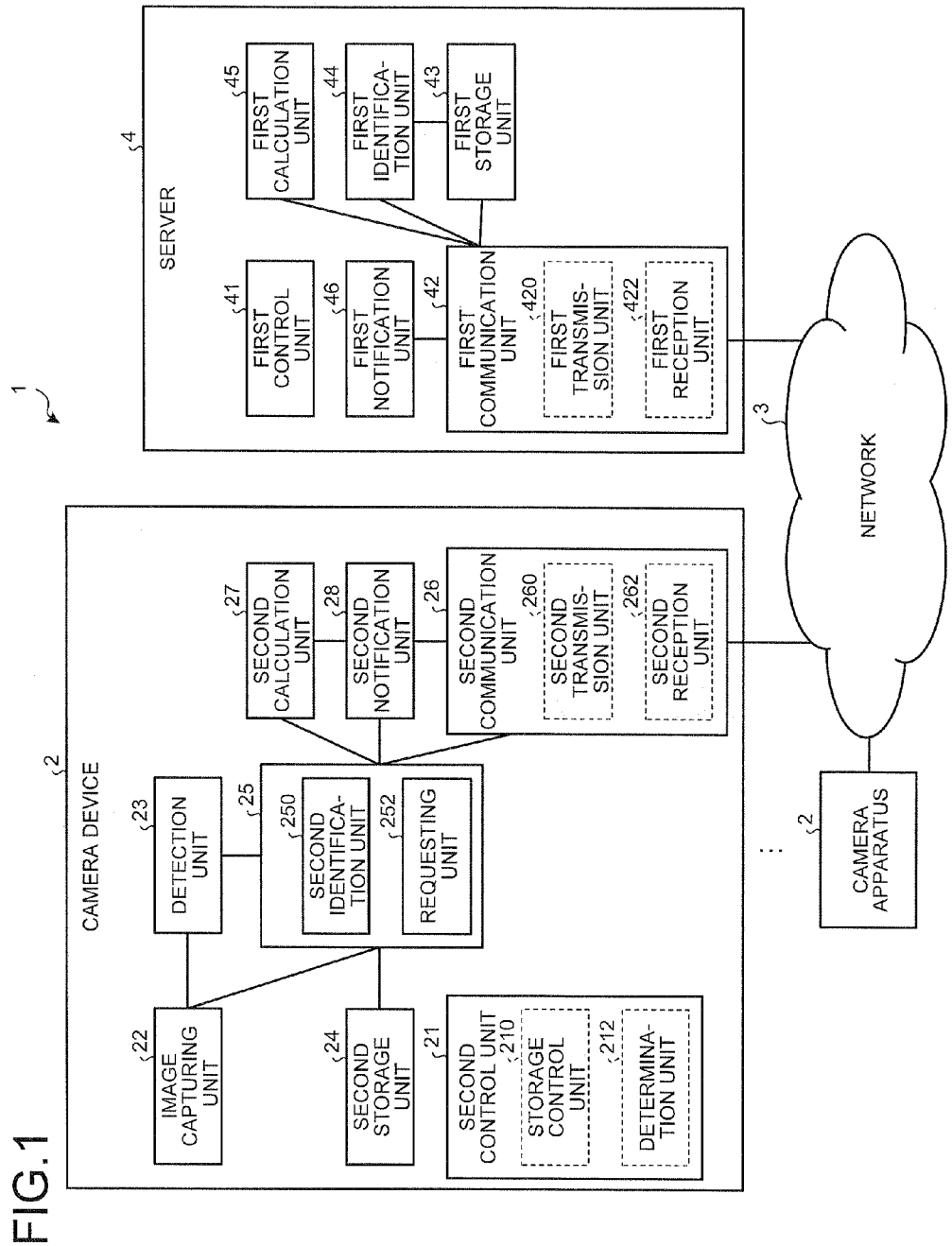
FIG. 1 is a functional block diagram illustrating a communication system according to a first embodiment.

FIG. 1 is a functional block diagram illustrating the communication system 1 according to the first embodiment. As illustrated in FIG. 1, the communication system 1 is configured so that a plurality of fixed camera devices 2 are each connected to a server 4 via a network 3. In other words, the communication system 1 is a client server system where the plurality of the camera devices 2 utilize information resources which are managed by the server 4 in a centralized manner.

The server 4 includes, for example, a first control unit 41, a first communication unit 42, a first storage unit 43, a first identification unit 44, a first calculation unit 45, and a first notification unit 46. The first control unit 41 controls components constituting the server 4.

The first communication unit 42 includes a first transmission unit 420 which transmits data and a first reception unit 422 which receives data to perform communication via the network 3. The first communication unit 42 provides a wireless local area network (LAN) where interconnectivity is guaranteed by, for example, Wi-Fi (registered trademark).

The first storage unit 43 is configured with, for example, a plurality of hard disk drives (HDDs) and the like. The first storage unit 43 stores database and the like including feature values of faces for performing image recognition with respect to, for example, faces of N persons and identification information (ID) which is associated with each feature value of N persons. In other words, information on N persons is registered in the first storage unit 43. Hereinafter, sometimes, a feature value which is associated with identification information is referred to as registration information (a combination of identification information and feature value).

The first identification unit 44 calculates a degree of similarity between a feature value (described later) transmitted by the camera device 2 and the feature value stored in the first storage unit 43. Next, by comparing the calculated degree of similarity with a pre-defined threshold value, the first identification unit 44 identifies (person identification) who is captured by an image capturing unit 22 among the N persons registered in the first storage unit 43.

In the case where the degree of similarity of the feature value received from the camera device 2 with respect to all feature values stored in the first storage unit 43 is lower than a pre-defined threshold value, the first identification unit 44 determines that the person captured by the image capturing unit 22 is not a person registered in the first storage unit 43 (there is no person concerned).

Under the control of the first control unit 41, the first calculation unit 45 acquires a time point at which communication is performed via the network 3 and an operation time point of the components of the camera devices 2 or the server 4 to calculate a later-described time difference or the like. In addition, the first calculation unit 45 may be configured so as to acquire the operation time point of the components of the camera devices 2 based on a time point at which identification information attached with individual flag information is acquired by the first communication unit 42.

The first notification unit 46 transmits (notifies) the above-described identification information through the first transmission unit 420.

When the server 4 receives the feature value from the camera device 2, the server 4 performs an identification process for a person by using the registration information. If the server 4 can identify the person, the server 4 transmits identification information of the identified person to the camera device 2 which transmits the feature value. When the server 4 receives identification information from the camera device 2, the server 4 transmits registration information corresponding to the identification information to the camera device 2 which transmits the identification information.

If the server 4 cannot identify the person, the server 4 registers new identification information which is associated with the received feature value as new registration information. The server 4 may be configured so that, if the server 4 cannot identify the person, the server 4 transmits information indicating a message ("there is no person concerned") to the camera device 2. When the server 4 transmits the information indicating "there is no person concerned" to the camera device 2, the camera device 2 registers new identification information which is associated with the feature value as new registration information. For example, when the camera device 2 registers new registration information, the server 4 receives and stores the registration information from the camera device 2.

The server 4 prevents redundant registration of the same person by using the identification information. The server 4 then stores all of the registration information, which is to be used in the communication system 1, in the first storage unit 43. In addition, the server 4 may be configured so as to store all positions (described later) of a person corresponding to each identification information.

The camera device 2 includes, for example, a second control unit 21, the image capturing unit 22, a detection unit 23, a second storage unit 24, a processing unit 25, a second communication unit 26, a second calculation unit 27, and a second notification unit 28. The second control unit 21 includes a storage control unit 210 and a determination unit 212 to control components of the camera device 2.

The storage control unit 210 controls the second storage unit 24 and the second communication unit 26. In addition, the storage control unit 210 performs communication between another camera device 2 and the server 4 connected to the network 3 to control writing and reading of data stored in the second storage unit 24. For example, the storage control unit 210 receives the registration information or the like through the second communication unit 26 from the server 4 and stores the received registration information or the like in the second storage unit 24. The determination unit 212 determines whether or not the second storage unit 24 stores identification information and feature value (or later-described attribute information).

The image capturing unit 22 is a camera which acquires an image by capturing a vicinity of a position where the camera device 2 is fixed. The image capturing unit 22 is not limited to capturing of an image using visible light, but it may be an infrared camera capturing an image in a dark site or the like. The image capturing unit 22 outputs the captured image to the detection unit 23 and the processing unit 25.

The detection unit 23 detects a moving object such as a person or a vehicle from the image received from the image capturing unit 22 and outputs a position and feature values or the like of the detected moving object to the processing unit 25. As a specific example, the detection unit 23 first detects the presence (or absence) of a person in the image captured by the image capturing unit 22. If a person is present in the image, the detection unit 23 extracts (calculates), for example, a position of the person and feature values of the face of the person for image recognition from the image and outputs the position and the feature values to the processing unit 25. Herein, the feature values calculated by the detection unit 23 are, for example, co-occurrence of histograms of oriented gradients (CoHOG) feature values or the like.

The second storage unit 24 is configured with, for example, a non-volatile memory, an HDD, or the like. The second storage unit 24 stores, for example, feature values of faces for image recognition with respect to faces of n persons, identification information (ID) which is associated with each feature value of n persons, or the like. In other words, the second storage unit 24 stores registration information of n persons.

In addition, the number (N) of persons registered in the first storage unit 43 is larger than the number (n) of persons registered in the second storage unit 24. For example, the registration information registered in the second storage unit 24 is equal to a portion of the registration information registered in the first storage unit 43. When the second storage unit 24 is short of storage capacity due to an increase in registration information, the second storage unit 24 is configured to erases data, for example, in the order of oldness of time in access history (access time point) so as to secure the storage capacity for the new registration information. The second storage unit 24 may be configured to erase the registration information in the order of oldness of registration time point.

The processing unit 25 includes a second identification unit 250 and a requesting unit 252. The second identification unit 250 calculates, for example, a degree of similarity between the feature value received from the detection unit 23 and the feature value stored in the second storage unit 24. Next, by comparing the calculated degree of similarity with a pre-defined threshold value, the second identification unit 250 identifies (person identification) who is captured by the image capturing unit 22 among the n persons registered in the second storage unit 24.

If the degree of similarity of the feature value received from the detection unit 23 with respect to all feature values stored in the second storage unit 24 is lower than a pre-defined threshold value, the second identification unit 250 determines that the person captured by the image capturing unit 22 is not a person registered in the second storage unit 24 (there is no person concerned).

When the second identification unit 250 determines that the person captured by the image capturing unit 22 is not a person registered in the second storage unit 24, the requesting unit 252 requests the server 4 to identify who is the person captured by the image capturing unit 22 through the second communication unit 26.

The second communication unit 26 includes a second transmission unit 260 and a second reception unit 262 to perform communication through the network 3. The second communication unit 26 provides a wireless LAN where interconnectivity is guaranteed by, for example, Wi-Fi (registered trademark). For example, when the requesting unit 252 requests the server 4 to identify who is the person captured by the image capturing unit 22, the second communication unit 26 transmits the feature values of the person captured by the image capturing unit 22 to the server 4 via the network 3. The second reception unit 262 receives the identification information or registration information which is transmitted by the server 4.

Under the control of the second control unit 21, the second calculation unit 27 acquires a time point at which communication is performed via the network 3 and an operation time point of the components of the camera devices 2 to calculate a later-described time difference or the like. The second calculation unit 27 may be configured so as to acquire the operation time point of the components of the camera devices 2 based on a time point at which identification information attached with individual flag information is acquired by the second communication unit 26.

The second notification unit 28 transmits (notifies) the above-described identification information through the second communication unit 26 to another camera device 2 (hereinafter, sometimes referred to as the second camera device 2) which is designated in advance or a later-described specified camera device 2 (hereinafter, sometimes referred to as the second camera device 2). For example, the second notification unit 28 transmits identification information to the second camera device 2 having a short moving time when a person moves in the shortest path from a capturing range of the current camera device 2 to a capturing range of the second camera device 2.

In addition, the camera device 2 is not limited to a process of identifying (person identification) a specified person based on feature values of a face in an image, but it may be configured, for example, so as to perform a process of identifying a person based on a costume of a person in an image. In addition, the camera device 2 may be configured to identify whether or not a person wears a specific uniform (for example, a uniform of a high school student, a uniform of a policeman, a uniform of a nurse, or the like).

In addition, the camera device 2 may be configured to identify whether or not to be a specific person based on a combination of a plurality of attributes extractable from an image such as gender, height, hair type, or age of appearance. The above-described feature values of a face in an image are one of attribute information of a moving object used for identifying the moving object. In other words, the camera device 2 and the server 4 identify the moving object by using attributes (attribute information) extracted from an image or a combination of the attribute information.

The camera device 2 may be configured to identify the moving object by using the image of the face of the person. Hereinafter, sometimes, image data (feature value of a face in image, an image of a face of a person, and the like) which is extracted from the image captured by the image capturing unit 22 to be used for identifying the object is simply referred to as image information. In other words, the image information is not associated with identification information, and registration information includes the identification information.

The camera device 2 may be configured so that, when the camera device 2 requests the server 4 to perform the identification process and then a person is not identified, the camera device 2 registers new identification information, which is associated with the feature values, as new registration information. When the camera device 2 registers new registration information, the camera device 2 transmits the registered registration information to the server 4.

First Operational Example

Figure 2:
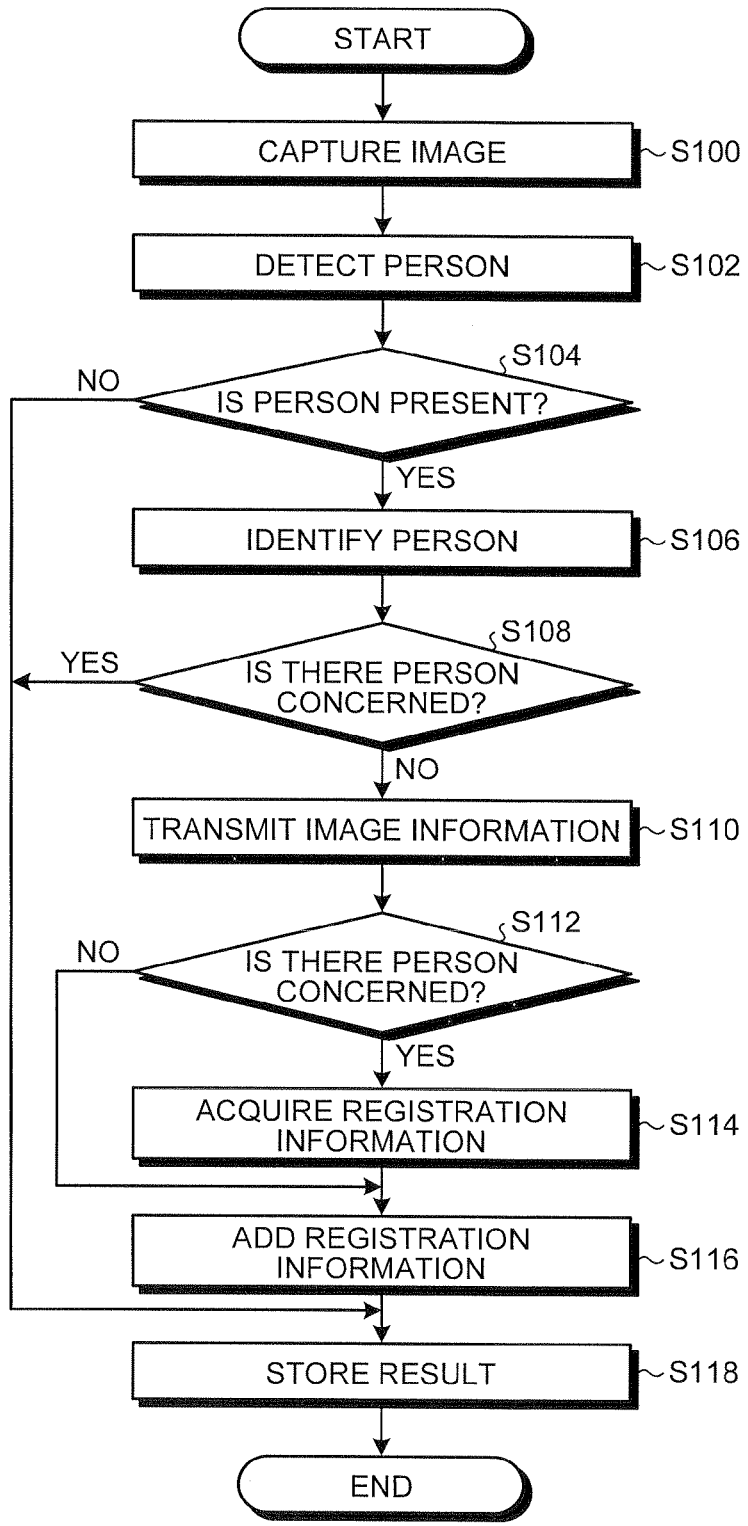
FIG. 2 is a flowchart illustrating a first operational example of a camera device.

A first operational example, of the communication system 1 will be described. FIG. 2 is a flowchart illustrating the first operational example of the camera device 2. As illustrated in FIG. 2, in Step S100, first, the camera device 2 allows the image capturing unit 22 to acquire an image by capturing a vicinity of a position where the camera device 2 is fixed.

In Step S102, the detection unit 23 detects a person from the image received from the image capturing unit 22.

In Step S104, the camera device 2 allows the second control unit 21 to determine whether or not the detection unit 23 detects a person. In other words, the camera device 2 determines whether or not a person is present in the image captured by the image capturing unit 22. If a person is present in the image (Yes in Step S104), the procedure proceeds to a process of Step S106; and if a person is not present in the image (No in Step S104), the procedure proceeds to a process of Step S118.

In Step S106, the second identification unit 250 performs person identification. Herein, although an example where there is one person in the image captured by the image capturing unit 22 is described, even when a plurality of persons are detected from the image, the camera device 2 performs the same process with respect to each of the persons.

In Step S108, the second identification unit 250 determines whether or not the person captured by the image capturing unit 22 is included in n persons registered in the second storage unit 24 (whether or not there is a person concerned). If there is a person concerned (Yes in Step S108), the procedure proceeds to a process of Step S118; and if there is no person concerned (No in Step S108), the procedure proceeds to a process of Step S110.

In Step S110, the requesting unit 252 transmits the image information (feature values) of the person captured by the image capturing unit 22 to the server 4.

In Step S112, the camera device 2 determines whether or not the person captured by the image capturing unit 22 is included in N persons registered in the first storage unit 43 (server 4) (whether or not there is a person concerned). If there is a person concerned (Yes in Step S112), the procedure proceeds to a process of Step S114; and in the case where there is no person concerned (No in Step S112), the procedure proceeds to a process of Step S116.

Herein, when the camera device 2 receives, for example, identification information from the server 4, the camera device 2 determines that the person captured by the image capturing unit 22 is included in N persons registered in the first storage unit 43 (there is a person concerted) (Yes in Step S112).

When the camera device 2 receives, for example, information indicating "there is not person concerned" from the server 4, the camera device 2 determines that the person captured by the image capturing unit 22 is not included in N persons registered in the first storage unit 43 (there is no person concerned) (No in Step S112).

In Step S114, the camera device 2 transmits the received identification information to the server 4 and acquires registration information which is associated with the identification information from the server 4.

In Step S116, the camera device 2 allows the registration information acquired in the process of Step S114 to be stored in the second storage unit 24. When the camera device 2 receives the information indicating "there is no person concerned" from the server 4, the camera device 2 allows image information, which is associated with new identification information to be stored as new registration information in the second storage unit 24. In other words, the second storage unit 24 is newly added with registration information of a person which is present in an image recently captured by the image capturing unit 22.

In Step S118, the camera device 2 allows, for example, identification information and position of the identified person or a process result indicating that there is no person in an image captured by the image capturing unit 22 to be stored in the second storage unit 24. The camera device 2 may be configured to selectively store (or transmit) a portion of registration information by using identification information or to store registration information together with a captured image.

Figure 3:
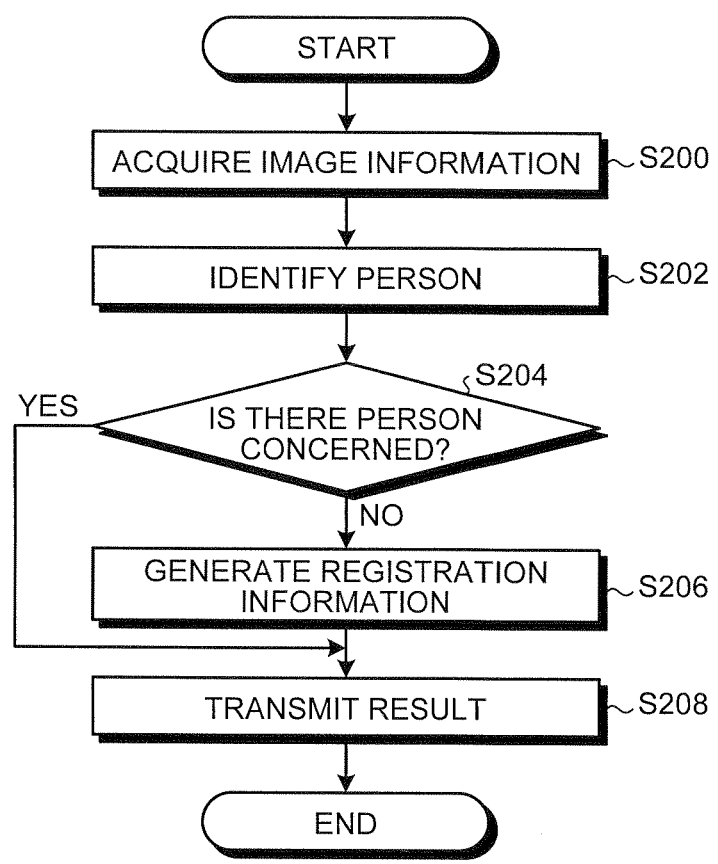
FIG. 3 is a flowchart illustrating a first operational example of a server.

FIG. 3 is a flowchart illustrating a first operational example of the server 4. As illustrated in FIG. 3, in Step S200, the server 4 acquires image information from the camera device 2.

In Step S202, the first identification unit 44 performs person identification.

In Step S204, the server 4 determines whether or not the person captured by the image capturing unit 22 is included in N persons registered in the first storage unit 43 (whether or not there is a person concerned). If there is a person concerned (Yes in Step S204), the procedure proceeds to a process of Step S208; and if there is no person concerned (No in Step S204), the procedure proceeds to a process of Step S206.

In Step S206, the server 4 generates new registration information by allowing the received image information to be associated with new identification information.

In Step S208, the server 4 transmits the identification information corresponding to the received image information to the camera device 2 (transmission of the result).

The communication system 1 may be configured so that, when the person captured by the image capturing unit 22 is not included in N persons registered in the first storage unit 43, the server 4 transmits information indicating "there is no person concerned" and the camera device 2 generates new registration information.

Figure 4:
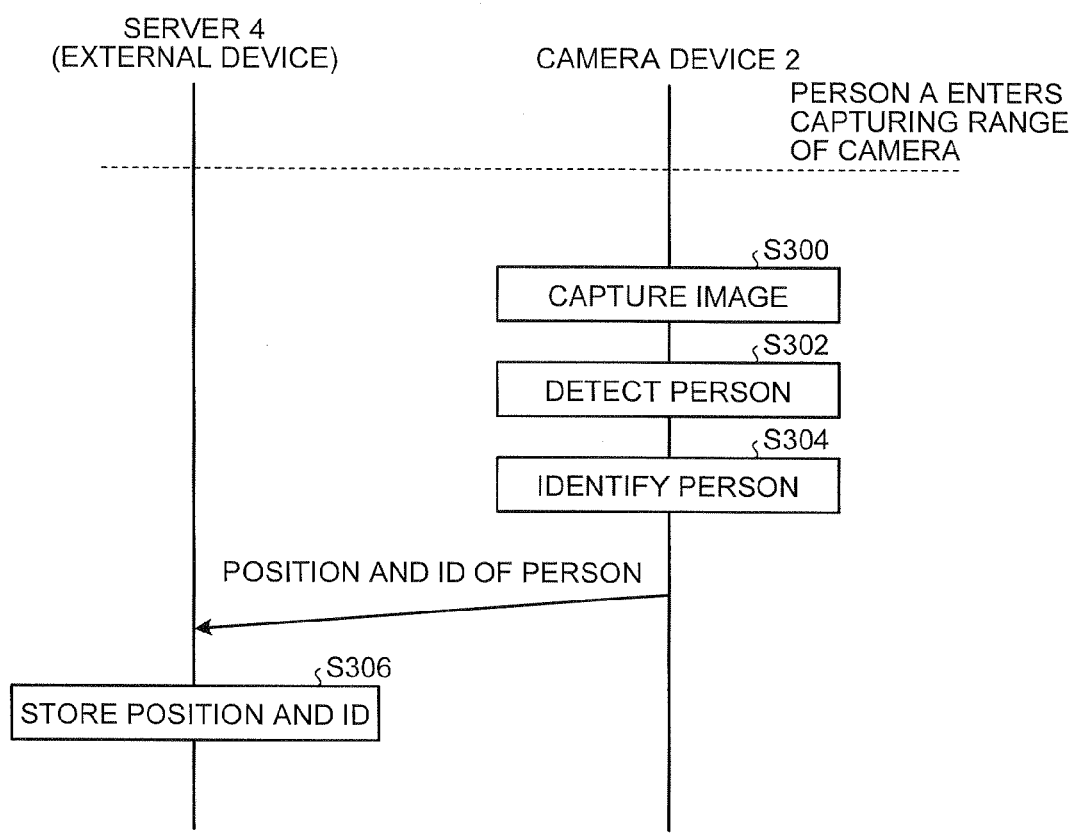
FIG. 4 is a sequence diagram illustrating communication in the case where a camera device succeeds in person identification.

FIG. 4 is a sequence diagram illustrating communication when the camera device 2 succeeds in person identification in the first operational example. As illustrated in FIG. 4, for example, when a person A enters a capturing range of the image capturing unit 22 (camera), the camera device 2 performs capturing (Step S300). Next, the camera device 2 performs person detection (Step S302) and performs person identification (Step S304).

When the camera device 2 succeeds in the person identification in the process of Step S304, the camera device 2 transmits a position and identification information (ID) of the identified person to the server 4.

The server 4 stores the position and identification information (ID) of the person transmitted from the camera device 2 (Step S306).

Figure 5:
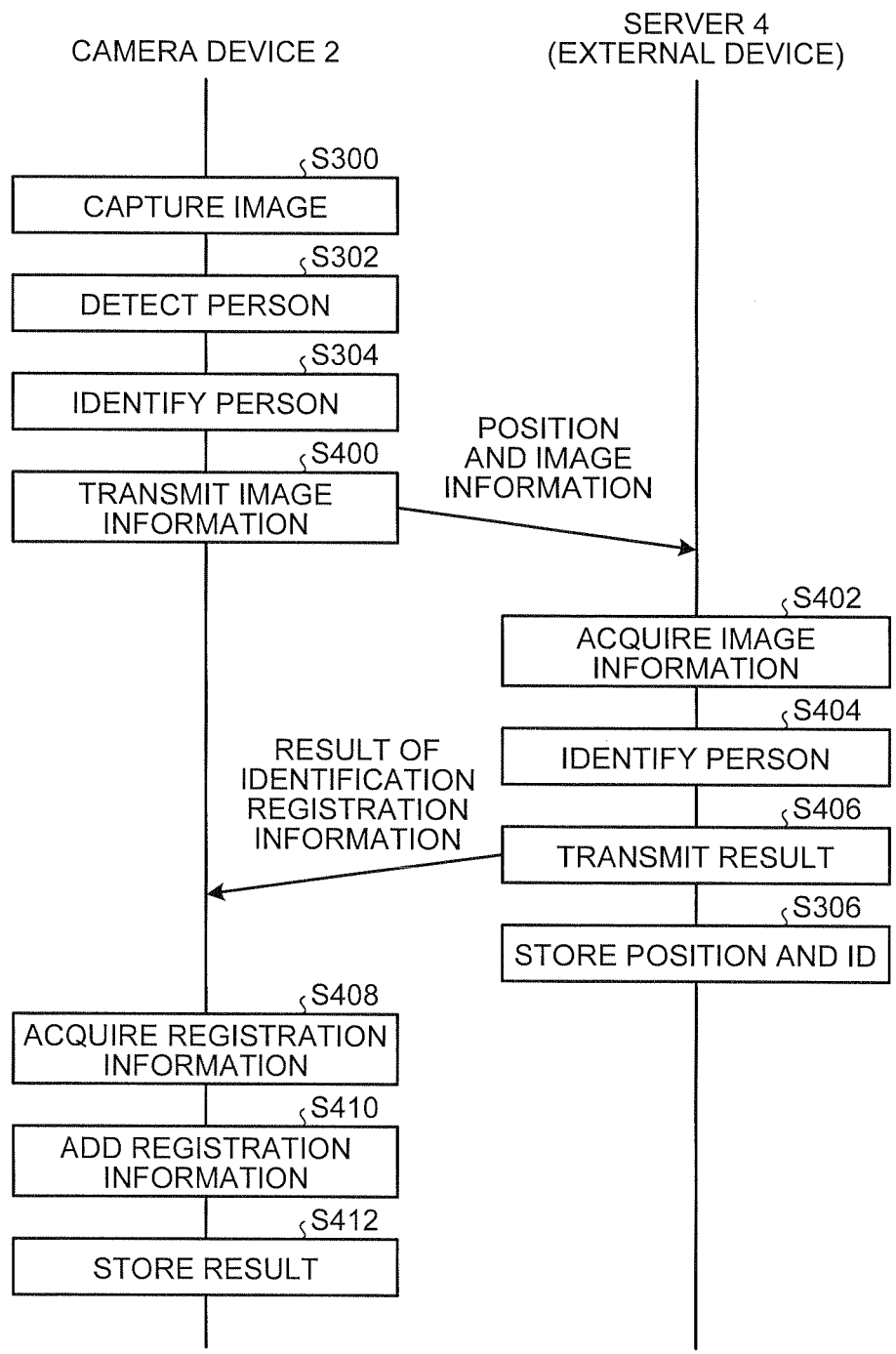
FIG. 5 is a sequence diagram illustrating communication in the case where a camera device may not perform person identification.

FIG. 5 is a sequence diagram illustrating communication when the camera device 2 cannot perform person identification in the first operational example. In addition, in FIG. 5, the processes which are substantially the same as those illustrated in FIG. 4 are denoted by the same reference numerals.

When the camera device 2 fails in the person identification in the process of Step S304, the camera device 2 transmits the position and image information of the person to the server 4 (Step S400).

The server 4 acquires image information from the camera device 2 (Step S402) and performs person identification by using the acquired image information (Step S404).

When the server 4 succeeds in the person identification in the process of Step S404, the server 4 transmits a result (identified registration information) of the person identification (Step S406).

When the camera device 2 acquires the registration information (Step S408), the camera device 2 adds the registration information to the second storage unit 24 (Step S410) and allows the process result such as identification information and position of the identified person to be stored in the second storage unit 24 or the like (Step S412).

In the communication system 1 according to the first embodiment, the operations described in the first operational example are performed, so that the camera device 2 identifies a moving object or the server 4 is requested to identify the moving object when the moving object cannot be identified by the camera device 2. Therefore, even if there are a large number of the camera devices 2, it is possible to reduce the processing amount of the server 4.

Second Operational Example

Figure 6:
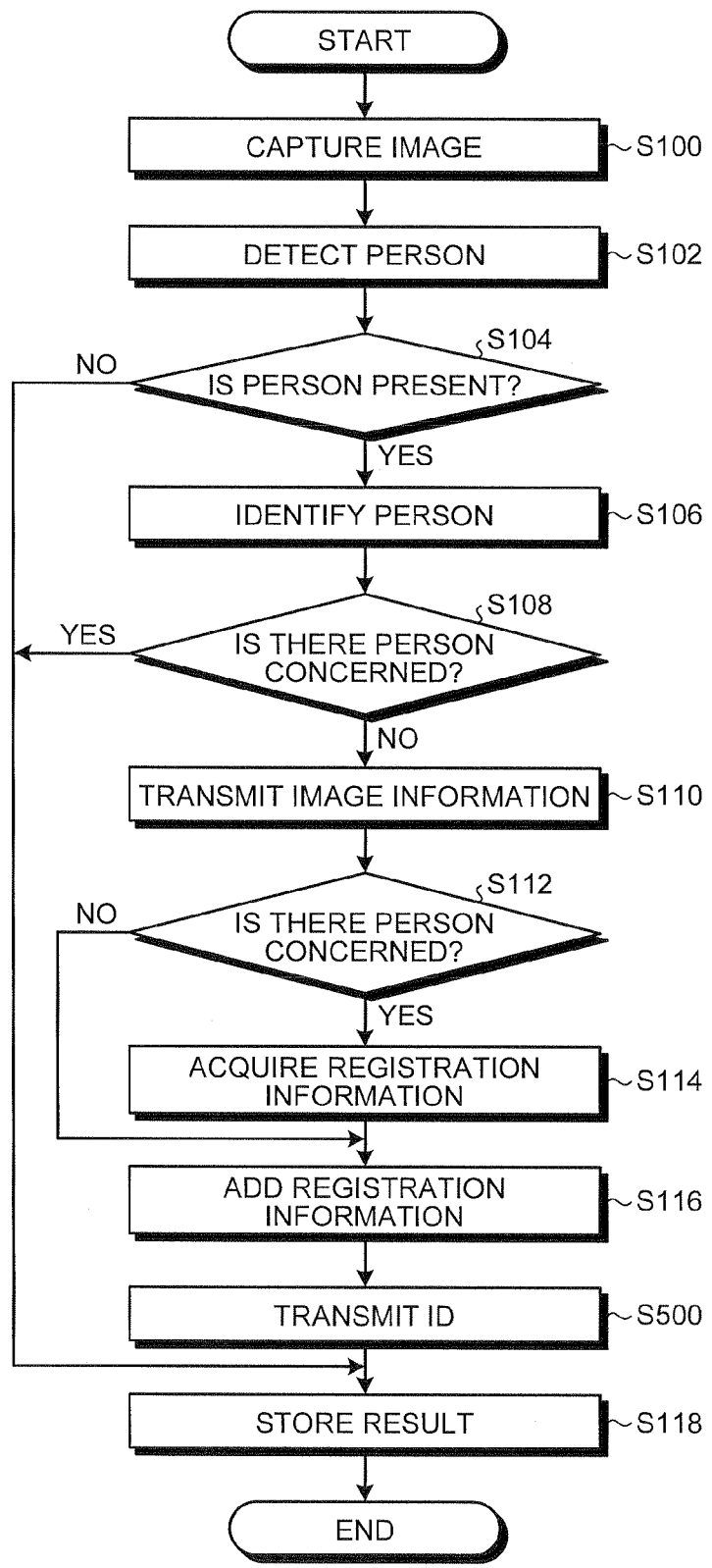
FIG. 6 is a flowchart illustrating a second operational example of a camera device (notification source)
Figure 7:
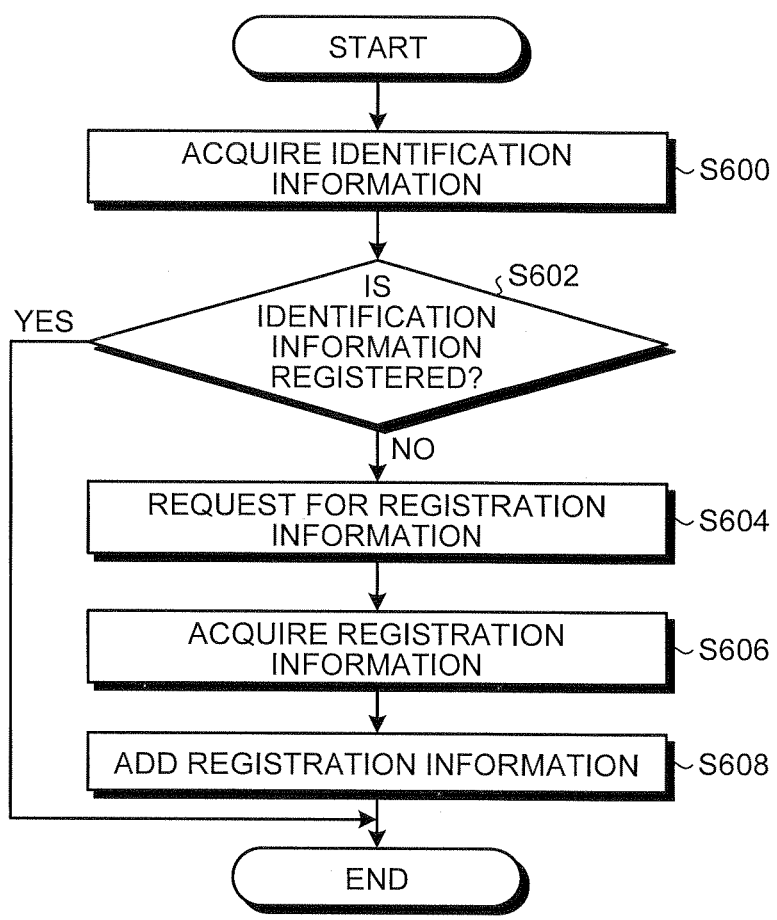
FIG. 7 is a flowchart illustrating a second operational example of another camera device (notification destination)

Next, a second operational example of the communication system 1 will be described. FIG. 6 is a flowchart illustrating the second operational example of the camera device 2 (notification source). FIG. 7 is a flowchart illustrating the second operational example of another camera device 2 (notification destination) other than the camera device 2 (notification source) performing the operations illustrated in FIG. 6. In FIG. 6, the processes which are substantially the same as those illustrated in FIG. 2 are denoted by the same reference numerals.

As illustrated in FIG. 6, in Step S500, the camera device 2 (notification source) transmits the identification information of the person identified in the process of Step S106 or the identification information (ID) corresponding to the registration information acquired in the process of Step S114 to another camera device 2 which is designated in advance by the second notification unit 28.

As illustrated in FIG. 7, in Step S600, the second camera device 2 (notification destination) acquires the identification information from the camera device 2 (notification source).

In Step S602, the second camera device 2 determines whether or not the registration information corresponding to the acquired identification information is registered. If the registration information corresponding to the identification information is not registered (No in Step S602), the second camera device 2 proceeds to the process of Step S604; and if the registration information corresponding to the identification information is registered (Yes in Step S602), the process is ended.

In Step S604, the second camera device 2 requests the camera device 2 to transmit the registration information.

In Step S606, the second camera device 2 acquires the registration information from the camera device 2.

In Step S608, the second camera device 2 allows the registration information acquired in the process of Step S606 to be stored (added) in the second storage unit 24.

Figure 8:
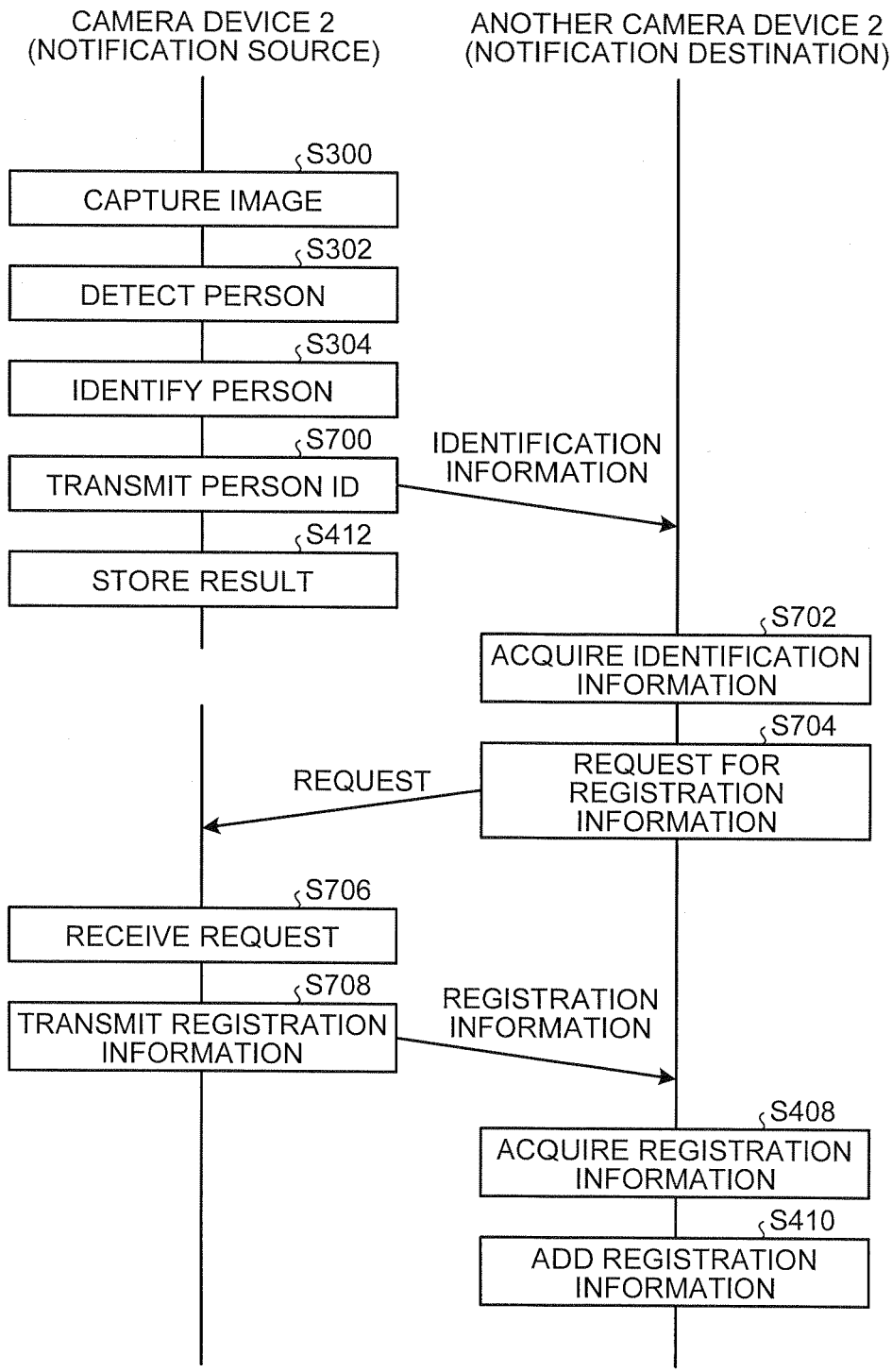
FIG. 8 is a sequence diagram illustrating communication between a camera device and another camera device.

FIG. 8 is a sequence diagram illustrating communication between the camera device 2 (notification source) and another camera device 2 (notification destination) in the second operational example. In addition, in FIG. 8, the processes which are substantially the same as those illustrated in FIG. 5 are denoted by the same reference numerals.

In Step S700, if the camera device 2 succeeds in the person identification in the process of Step S304, the camera device 2 transmits the identification information (ID) of the identified person to the second camera device 2.

In Step S702, the second camera device 2 acquires the identification information.

In Step S704, the second camera device 2 determines whether or not the registration information corresponding to the identification information acquired in the process of Step S702 is registered, and if the registration information is not registered, the second camera device 2 requests the camera device 2 to transmit the registration information. If the registration information corresponding to the identification information acquired in the process of Step S702 is registered, the second camera device 2 allows the process to be ended.

In Step S706, the camera device 2 receives the request for transmission of registration information from the second camera device 2.

In Step S708, the camera device 2 transmits the registration information, which is requested from the second camera device 2, to the second camera device 2.

The camera device 2 may perform the processes of Step S706 and Step S708 as interrupting processes at arbitrary timing.

In the communication system 1 according to the first embodiment, the operations of the second operational example are performed, so that it is possible to reduce the number of times of the second camera device 2 requesting the server 4 to perform identification of the moving objet, on which the camera device 2 (notification source) requests the server 4 to perform identification. In other words, each of the camera devices 2 can propagate the registration information without utilizing the server 4. Therefore, in the communication system 1 according to the first embodiment, the operations of the second operational example are performed, so that it is possible to reduce the processing amount of the server 4 even if there are a large number of the camera devices 2.

Third Operational Example

Next, a third operational example of the communication system 1 will be described. As described above, the server 4 includes the first calculation unit 45. For example, the first calculation unit 45 acquires a time point A(h, n) at which the camera device 2 detects a person h n times and a time point B(h, m) at which the second camera device 2 detects the same person h m times and calculates a time difference thereof by using the following Expression (1).

$$\min_{h,n,m} |A(h, n) - B(h, m)| \tag{1}$$

The time difference calculated by using Expression (1) is a shortest moving time taken when the person h moves between the two camera devices 2.

The first calculation unit 45 may calculate a time difference between a time point at which the identification information is transmitted from the second camera device 2 and a time point at which the second identification unit 250 identifies a person by using the received identification information as the moving time. The first calculation unit 45 may calculate a time difference between a time point at which the identification information is transmitted from the second camera device 2 and a time point at which the requesting unit 252 requests for identification as the moving time.

In the third operation example, the second notification unit 28 of the camera device 2 transmits (notifies) the above-described identification information through the second communication unit 26 to the second camera device 2 which is specified according to the moving time calculated by the first calculation unit 45. More specifically, in the case where the calculated moving time is shorter than a pre-defined time, the camera device 2 transmits the identification information to the second camera device 2 which transmits the identification information. In addition, the camera device 2 may be configured so as to transmit the identification information to a pre-defined number or less other camera devices 2 in the ascending order of the moving time calculated by the first calculation unit 45.

In the communication system 1 according to the first embodiment, the operations described in the third operational example are performed, so that even if another camera device 2 to which the identification information (or registration information) is to transmitted is not designated in advance, it is possible to specify another camera device 2 to which the identification information (or registration information) is to transmitted from the camera device 2.

Fourth Operational Example

Next, a fourth operational example of the communication system 1 will be described. As described above, the camera device 2 includes the second calculation unit 27. For example, similarly to the above-described first calculation unit 45, the second calculation unit 27 calculates a moving time of a person.

In the fourth operational example, the second notification unit 28 of the camera device 2 transmits (notifies) the above-described identification information through the second communication unit 26 to the second camera device 2 which is specified according to the moving time calculated by the second calculation unit 27. More specifically, in the case where the calculated moving time is shorter than a pre-defined time, the camera device 2 transmits the identification information to the second camera device 2 which transmits the identification information. In addition, the camera device 2 may be configured so as to transmit the identification information to a pre-defined number or less other camera devices 2 in the ascending order of the moving time calculated by the second calculation unit 27.

In the communication system 1 according to the first embodiment, the operations described in the fourth operational example are performed, so that even if another camera device 2 to which the identification information (or registration information) is to transmitted is not designated in advance, it is possible to specify another camera device 2 which the identification information is to transmitted from the camera device 2.

Second Embodiment

Hereinafter, a communication system according to a second embodiment of the present invention will be described in detail with reference to the attached drawings.

Figure 9:
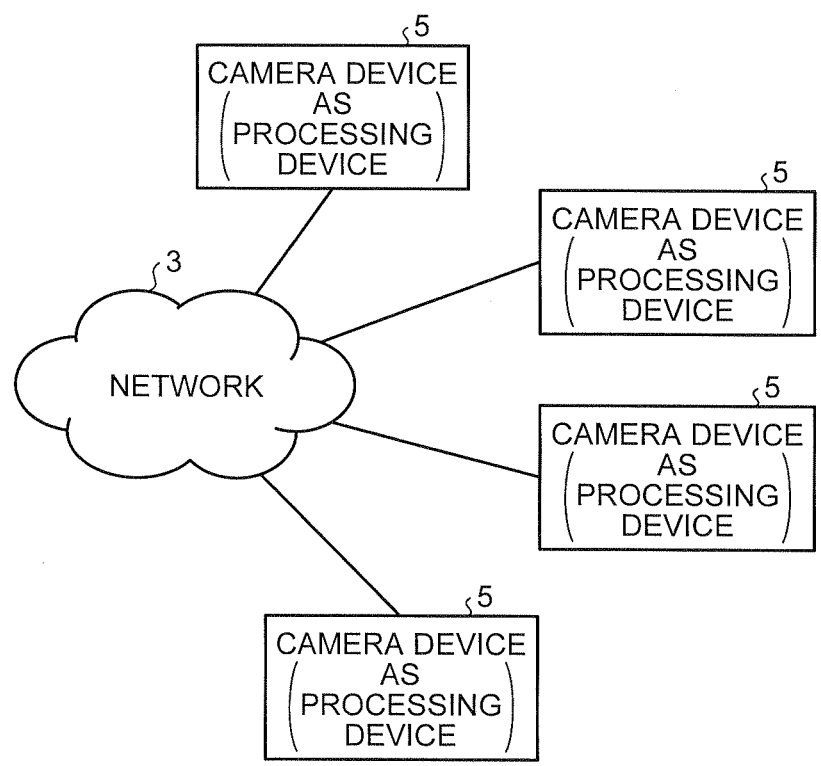
FIG. 9 is a diagram illustrating an outline configuration of a communication system according to a second embodiment.

FIG. 9 is a diagram illustrating an outline configuration of the communication system according to the second embodiment. As illustrated in FIG. 9, the communication system according to the second embodiment is a camera system configured so that a plurality of fixed camera devices 5 are connected to each other via the network 3. In addition to the functions of the camera device 2 illustrated in FIG. 1, each camera device 5 has a function as a server 4 (processing device). However, the function of the server 4 is distributed to the camera devices 5.

More specifically, the camera devices 5 are equal to each other in hardware. However, the registration information of N persons stored in the first storage unit 43 of the server 4 is distributed to the camera devices 5. In other words, the camera device 5 requests other camera devices 5 to identify the moving object instead of requesting the server 4 to identify the moving object. In addition, the camera device 5 transmits (notifies) the above-described identification information through the second communication unit 26 to the other camera devices 5 which are specified according to the moving time calculated by the second calculation unit 27. In other words, each of the camera devices 5 cooperatively operates so as to propagate the registration information according to the movement of the person.

The camera devices 5 are not limited to have the same hardware. For example, in a configuration, a storage capacity of a second storage unit 24 of the camera device 5 may be larger than a storage capacity of the second storage unit 24 of another camera device 5, and the operation thereof may be preferentially performed.

In addition, in a configuration, each of the camera devices 5 transmits image information to a plurality of other camera devices 5 to acquire a plurality of identification information. In addition, each of the camera devices 5 may transmit the above-described identification information through the second communication unit 26 to another camera device 5 (hereinafter, referred to as the second camera device 5) which is specified according to the moving time calculated by the second calculation unit 27.

In addition, in the case where the camera device 5 registers new registration information, the camera device 5 may add, for example, a number unique to each camera device 5 or the like to the identification information, so that redundant registration of the registration information registered by the second camera device 5 can be prevented.

In the communication system according to the second embodiment, the camera device 5 identifies a moving object, and if the moving object cannot be identified, the second camera device 5 performs the identification. Accordingly, it is possible to identify the moving object without the server 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera device comprising:
   an image capturing unit;
   a storage unit configured to store attribute information of one or more target objects used for identifying the corresponding target objects, wherein the storage unit stores identification information of the target objects and the attribute information of the target objects in association with each other;
   an identification unit configured to identify a target object in an image captured by the image capturing unit based on the attribute information;
   a requesting unit configured to request an external device to identify the target object in the image when the identification unit is not able to identify the target object in the image;
   a storage control unit configured to receive attribute information of the target object from the external device that is requested to identify the target object, and control the storage unit to store the received attribute information;
   a transmission unit configured to transmit identification information of the target object to another camera device when the identification unit identifies the target object in the image;
   a determination unit configured to determine, when identification information is received from another camera device, whether or not the received identification information is stored in the storage unit, wherein when the determination unit determines that the received identification information is not stored in the storage unit, the storage control unit receives attribute information of the target object that is identified by the received identification information from the other camera device that is a transmission source of the received identification information, and controls the storage unit to store the received attribute information; and
   a moving time calculation unit configured to calculate a time difference between a time point at which the identification information is transmitted from the other camera device and a time point at which the identification unit identifies the target object based on the identification information from the other camera device or a time point at which the requesting unit requests for the identification, as a moving time of the target object associated with the identification information, when the identification information is received from the other camera device, wherein when the moving time calculated by the moving time calculation unit is shorter than a pre-defined time, the transmission unit transmits the identification information to the other camera device that has transmitted the identification information.

2. The camera device according to claim 1, wherein the attribute information of the target object from the external device is one of attribute information of a target object used for identifying the target object.

3. The camera device according to claim 1, wherein the attribute information of the target object from the external device is based on a combination of a plurality of attributes extractable from an image.

4. The camera device according to claim 3, wherein the combination of the plurality of attributes includes two or more of gender, height, hair type, and age of appearance.

5. A camera device comprising:
   an image capturing unit;
   a storage unit configured to store attribute information of one or more target objects used for identifying the corresponding target objects, wherein the storage unit stores identification information of the target objects and the attribute information of the target objects in association with each other;
   an identification unit configured to identify a target object in an image captured by the image capturing unit based on the attribute information;
   a requesting unit configured to request an external device to identify the target object in the image when the identification unit is not able to identify the target object in the image;
   a storage control unit configured to receive attribute information of the target object from the external device that is requested to identify the target object, and control the storage unit to store the received attribute information;
   a transmission unit configured to transmit identification information of the target object to another camera device when the identification unit identifies the target object in the image;
   a determination unit configured to determine, when identification information is received from another camera device, whether or not the received identification information is stored in the storage unit, wherein when the determination unit determines that the received identification information is not stored in the storage unit, the storage control unit receives attribute information of the target object that is identified by the received identification information from the other camera device that is a transmission source of the received identification information, and controls the storage unit to store the received attribute information; and
   a moving time calculation unit configured to calculate a time difference between a time point at which the identification information is transmitted from the other camera device and a time point at which the identification unit identifies the target object based on the identification information or a time point at which the requesting unit requests for the identification, as a moving time of the target object that is associated with the identification information, when the identification information is received from the other camera device, wherein the transmission unit transmits the identification information to a predetermined number or less of other camera devices in ascending order of the moving time calculated by the moving time calculation unit.

6. The camera device according to claim 5, wherein the attribute information of the target object from the external device is one of attribute information of a target object used for identifying the target object.

7. The camera device according to claim 5, wherein the attribute information of the target object from the external device is based on a combination of a plurality of attributes extractable from an image.

8. The camera device according to claim 7, wherein the combination of the plurality of attributes includes two or more of gender, height, hair type, and age of appearance.

9. A communication system comprising a plurality of camera devices and a server, wherein
the server comprises:
a first storage unit configured to store attribute information of one or more target objects used for identifying the corresponding target objects;
a first identification unit configured to identify a target object based on the attribute information when any one of the camera devices requests for identification of a target object in an image; and
a first transmission unit configured to transmit the attribute information used for identifying the target object in the image to the camera device that requests for identification of the target object when the first identification unit identifies the target object, and
each of the camera devices comprises:
an image capturing unit;
a second storage unit configured to store attribute information of one or more target objects used for identifying the corresponding target objects, wherein the second storage unit stores identification information of the target objects and the attribute information of the target objects in association with each other;
a second identification unit configured to identify a target object in an image captured by the image capturing unit based on the attribute information stored in the second storage unit;
a requesting unit configured to request the server to identify the target object in the captured image when the second identification unit is not able to identify the target object in the captured image;
a storage control unit configured to receive the attribute information of the target object in the captured image from the server, and control the storage unit to store the received attribute information;
a transmission unit configured to transmit identification information of the identified target object to another camera device when the identification unit identifies the target object in the captured image;
a determination unit configured to determine, when identification information is received from another camera device, whether or not the received identification information is stored in the second storage unit, wherein when the determination unit determines that the received identification information is not stored in the second storage unit, the storage control unit receives the attribute information of the target object that is identified by the received identification information from the other camera device, and controls the second storage unit to store the received attribute information; and
a moving time calculation unit configured to calculate a time difference between a time point at which the identification information is transmitted from the other camera device and a time point at which the identification unit identifies the target object based on the identification information from the other camera device or a time point at which the requesting unit requests for the identification, as a moving time of the target object associated with the identification information, when the identification information is received from the other camera device, wherein when the moving time calculated by the moving time calculation unit is shorter than a pre-defined time, the transmission unit transmits the identification information to the other camera device that has transmitted the identification information.

10. A camera system comprising a plurality of camera devices,
wherein each of the camera devices comprises:
an image capturing unit;
a storage unit configured to store attribute information of one or more target objects used for identifying the corresponding target objects, wherein the storage unit stores identification information of the target objects and the attribute information in association with each other;
an identification unit configured to identify a target object in an image captured by the image capturing unit based on the attribute information stored in the storage unit;
a requesting unit configured to request another camera device to identify the target object in the image when the identification unit is not able to identify the target object in the image; and
a storage control unit configured to receive attribute information by which the target object whose identification is requested by the requesting unit is able to be identified, from the other camera device, and control the storage unit to store the received attribute information;
a transmission unit configured to transmit identification information of an identified target object to another camera device when the identification unit identifies the target object in the image;
a determination unit configured to determine, when identification information is received from another camera device, whether or not the received identification information is stored in the storage unit, wherein when the determination unit determines that the received identification information is not stored in the storage unit, the storage control unit receives the attribute information of the target object that is identified by the identification information from the other camera device that is a transmission source of the received identification information, and controls the storage unit to store the received attribute information; and
a moving time calculation unit configured to calculate a time difference between a time point at which the identification information is transmitted from the other camera device and a time point at which the identification unit identifies the target object based on the identification information or a time point at which the requesting unit requests for the identification, as a moving time of the target object that is associated with the identification information, when the identification information is received from the other camera device, wherein the transmission unit transmits the identification information to a predetermined number or less of other camera devices in ascending order of the moving time calculated by the moving time calculation unit.

* * * * *